(12) United States Patent
Ang et al.

(10) Patent No.: US 8,393,539 B2
(45) Date of Patent: Mar. 12, 2013

(54) IN-FLIGHT PROGRAMMING OF TRIGGER TIME OF A PROJECTILE

(75) Inventors: Thomas Yong Lim Ang, Singapore (SG); Say Him Ng, Singapore (SG); Cheng Hok Aw, Singapore (SG)

(73) Assignee: Advanced Material Engineering Pte Ltd., Singapore (SG)

( * ) Notice: Subject to any disclaimer, the term of this patent is extended or adjusted under 35 U.S.C. 154(b) by 174 days.

(21) Appl. No.: 12/918,288

(22) PCT Filed: Feb. 18, 2009

(86) PCT No.: PCT/SG2009/000054
§ 371 (c)(1),
(2), (4) Date: Nov. 17, 2010

(87) PCT Pub. No.: WO2009/105038
PCT Pub. Date: Aug. 27, 2009

(65) Prior Publication Data
US 2011/0048218 A1    Mar. 3, 2011

(30) Foreign Application Priority Data
Feb. 18, 2008  (SG) .................................. 200801528

(51) Int. Cl.
*G06F 19/00* (2011.01)
(52) U.S. Cl. ..................................................... 235/400
(58) Field of Classification Search .................. 235/400, 235/401, 404, 408, 411, 417; 102/501; 89/6
See application file for complete search history.

(56) References Cited

U.S. PATENT DOCUMENTS

| | | | |
|---|---|---|---|
| 4,502,052 A | 2/1985 | Colby, Jr. | |
| 4,589,610 A | 5/1986 | Schmidt | |
| 5,841,058 A * | 11/1998 | Manis | ................. 89/8 |
| 6,216,595 B1 | 4/2001 | Lamorlette et al. | |
| 6,669,477 B2 * | 12/2003 | Hulet | ............... 434/14 |
| 7,021,187 B1 | 4/2006 | Grassi | |
| 7,140,574 B1 | 11/2006 | Brunson et al. | |
| 7,703,679 B1 * | 4/2010 | Bennetts et al. | .............. 235/454 |
| 2007/0074625 A1 | 4/2007 | Seidensticker et al. | |

FOREIGN PATENT DOCUMENTS

| | | |
|---|---|---|
| DE | 33 09 147 | 9/1984 |
| JP | 8-94300 | 4/1996 |
| JP | 2002-162199 | 6/2002 |

OTHER PUBLICATIONS

International Search Report and Written Opinion mailed on Apr. 22, 2009, directed to counterpart International Patent Application No. PCT/SG2009/000054; 7 pages.

* cited by examiner

*Primary Examiner* — Seung Lee
(74) *Attorney, Agent, or Firm* — Pyprus Pte Ltd

(57) ABSTRACT

The present invention describes methods for programming trigger time of a projectile (60) based on remaining flight time to a target (P) after the projectile (60) is airborne. The actual muzzle (Vo) and flight speeds (V1, V2, etc.) are independently determined and compared to those used by the ballistic computer (30), and a better estimate of trigger time is accordingly used to activate detonation of the projectile (60). In one embodiment, a Kalman algorithm is used to provide a better estimate of the projectile's flight speeds obtained by independent methods to provide the better estimate of the trigger time.

6 Claims, 2 Drawing Sheets

IN-FLIGHT PROGRAMMING OF TRIGGER TIME OF A PROJECTILE

FIELD OF INVENTION

The present invention relates to systems and methods for programming trigger time of a projectile after the projectile is launched from a barrel.

BACKGROUND

Projectiles fired from barrels follow trajectories that are well-defined or predictable. In use, a firing control or ballistic computer determines the barrel's angle of inclination a for a specific projectile type when given a desired impact point, barrel conditions, wind velocity, etc. However, due to variations in the amount of explosive charge primed in a cartridge of each projectile, tolerances in the driving band and associated barrel wear and thermal expansion, cleanliness of the barrel, variations in humidity, and so on, the muzzle velocity of each projectile after exiting from the barrel suffers some deviations. The deviations in the muzzle velocity thus cause the impact point to deviate from the desired target position. In addition, after a projectile is air-borne, variations in wind velocity and environmental factors also affect the accuracy of the impact or detonation position.

For large projectiles, there may be sufficient space and payload to employ active tracking of the target position. Target tracking may use global position system, laser, etc., and supplementary booster and/or steering fins and brakes. However, for small and inexpensive projectiles, target tracking is not employed; for example, U.S. Pat. No. 7,021,187, assigned to the US army, describes an ammunition launcher in which trigger time of a typical ammunition is permanently programmed into a fuse contained therein. Deviations in muzzle velocity and variations in environmental factors cannot be accounted for in setting the trigger time of the ammunition.

A known method for updating the trigger time of a small projectile is to track the speed of each projectile, for example, by Doppler or laser tachometer and re-programming the trigger time according to the remaining flight time to the target position; for example, U.S. Pat. No. 6,216,595, assigned to Giat Industries, describes such a method. Thus, there is a need for other methods of tracking or determining the speeds of small projectiles so that the trigger time of each projectile can be programmed or updated to optimize the effect of the projectile.

SUMMARY

The following presents a simplified summary to provide a basic understanding of the present invention. This summary is not an extensive overview of the invention, and is not intended to identify key features of the invention. Rather, it is to present some of the inventive concepts of this invention in a generalised form as a prelude to the detailed description that is to follow.

For small projectiles, an approach to improving the effectiveness of the projectile is to update or change the trigger or detonation time of each projectile during its remaining flight time to a target position. With this approach, variations in wind velocity and environmental factors can be compensated for.

In one embodiment, the present invention provides a method of programming a trigger time of a projectile, the method comprises: determining a muzzle velocity of a projectile after it exits from an associated gun barrel; determining an flight speed of the projectile a predetermined time after it has been fired; and accounting for the deviation of the projectile's muzzle velocity and flight speed from those determined by an associated ballistic computer and programming the trigger time during the remaining flight time as the projectile is reaching its target, thereby optimizing the effectiveness of the projectile.

In another embodiment, the projectile emits periodic signal at relevant predetermined time after the projectile is fired and the signal strength received by an antenna connected to the ballistic computer is determined, and the projectile's muzzle velocity and flight speed are then determined from signal strength-distance data stored in the ballistic computer.

In another embodiment, the projectile's muzzle velocity and flight speed are obtained from a flow sensor. In yet another embodiment, the projectile's muzzle velocity and flight speed are obtained from a MEM accelerometer. The projectile's muzzle velocity and flight speeds may be transmitted back to the ballistic computer for calculating the trigger time of the projectile. Alternatively, the projectile's muzzle velocity and flight speeds may be computed in a microprocessor in the projectile.

In yet another embodiment, the projectile's muzzle velocity and flight speeds obtained independently by the above processes may be recursively obtained by Kalman filtering. In addition, reliability weighting factors may be applied to each independently obtained muzzle velocity and flight speed.

BRIEF DESCRIPTION OF THE DRAWINGS

This invention will be described by way of non-limiting embodiments of the present invention, with reference to the accompanying drawings, in which.

DETAILED DESCRIPTION

Figure 1:
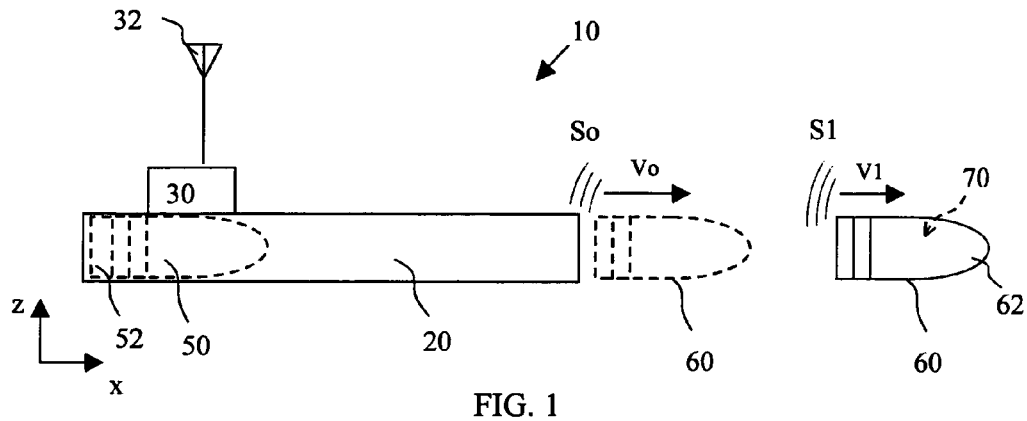
FIG. 1 illustrates a gun system in accordance with an embodiment of the present invention.

One or more specific and alternative embodiments of the present invention will now be described with reference to the attached drawings. It shall be apparent to one skilled in the art, however, that this invention may be practised without such specific details. Some of the details may not be described at length so as not to obscure the invention. For ease of reference, common reference numerals or series of numerals will be used throughout the figures when referring to the same or similar features common to the figures.

FIG. 1 shows a gun system 10 according to an embodiment of the present invention. As shown in FIG. 1, the gun system 10 has a barrel 20, a ballistic computer 30 and an antenna 32 linked to the ballistic computer 30. In another embodiment, the barrel 20 is operable to incline at an angle $\alpha$ with respect to a horizontal axis x. In addition, the barrel 20 may be additionally rotatable about an angle $\theta$ with respect to a vertical axis z.

Figure 2:
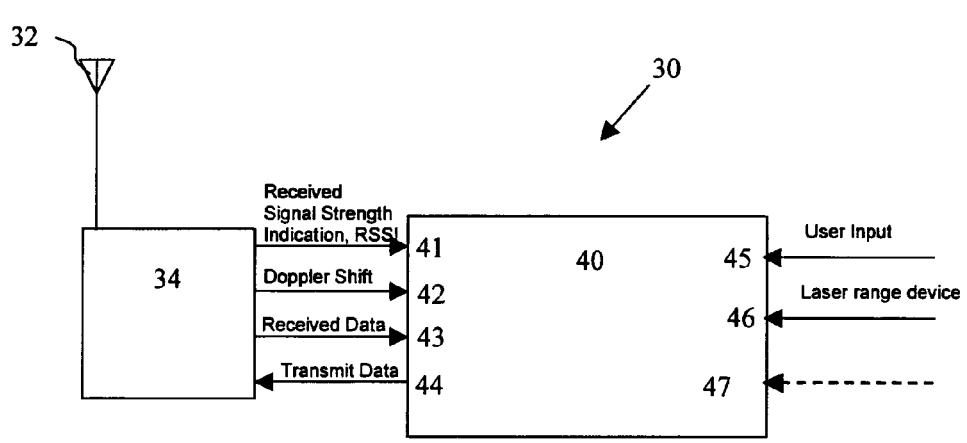
FIG. 2 illustrates a ballistic computer for use with the gun system shown in FIG. 1.

FIG. 2 shows a schematic of the ballistic computer 30. As shown in FIG. 2, the ballistic computer 30 has a radio-frequency (RF) analog front end 34 and a central processor 40. The analog front end 34 of the ballistic computer 30 is connected to the antenna 32 and the central processor 40. The connections between the analog front end 34 and the central processor 40 include channels for received signal strength indication (RSSI) input 41, Doppler frequency shift input 42, data receipt input 43, and data transmit output 44. In addition, the central processor 40 also includes a user input 45 channel. The user input 45 may include a plurality of inputs, such as a distance or coordinates of a target position P with respect to the gun barrel 20, wind velocity, weather conditions, and so on. In another embodiment of the central processor 40, the central processor includes an additional channel 46 for connection with a laser range finder.

Figure 3:
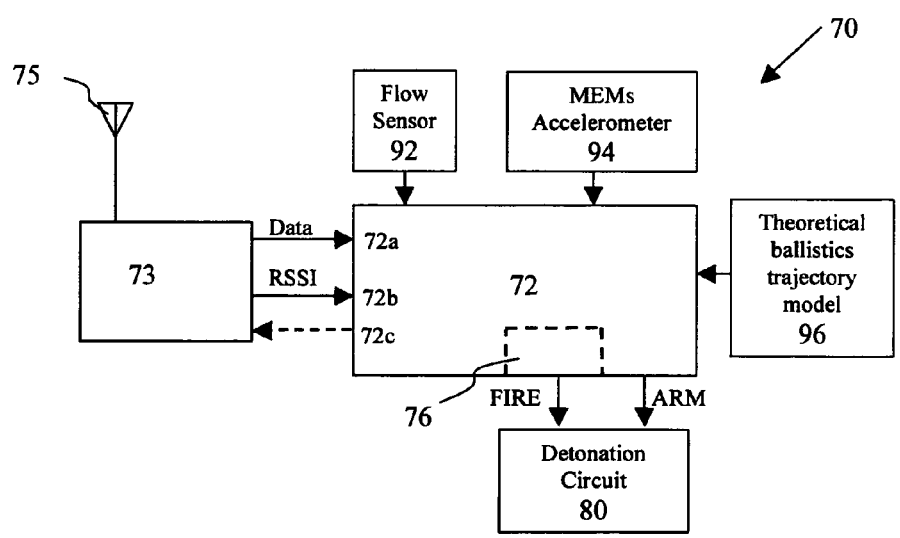
FIG. 3 illustrates a control circuit of a projectile, which forms part of the ammunition shown in FIG. 1.

The gun system 10 is used for firing an ammunition 50. As shown in FIG. 1, each ammunition 50 includes a projectile 60 and a cartridge 52. Each projectile 60 carries a control circuit 70 and an explosive charge 62. As shown in FIG. 3, the control circuit 70 includes a microprocessor 72, a radio-frequency (RF) analog circuit 73 connected to an antenna 75, and a detonation circuit 80. Also as shown in FIG. 3, the connections between the RF analog circuit 73 and microprocessor 72 include a data receipt input 72a and a received signal strength indicator (RSSI) input 72b. In addition, the microprocessor 72 also has channels for connections with a flow sensor 92 and a micro-electromechanical (MEM) accelerometer 94. An output of the microprocessor 72 is connected to the detonation circuit 80, which is used to fire or detonate the explosive material 62 at or near the target position P (not shown in the figures but understood). In another embodiment of the microprocessor 72, a data transmit output 72c may be additionally provided; outputs from the flow sensor 92 and/or MEM accelerometer 94 may be transmitted back to the ballistic computer 30 for processing and the results from the ballistic computer may be transmitted to the microprocessor 72 of the projectile via the data 72a input channel.

In another embodiment of the control circuit 70, the RF analog circuit 73 includes an encoder/decoder 74. Alternatively or in addition, the microprocessor 72 includes the encoder/decoder 74. In another embodiment of the control circuit 70, the microprocessor 72 includes a timer 76; the timer 76 sets the trigger time of the detonation circuit 80, either by time count down or count up according to the remaining flight time to the target position P in response to an output of the microprocessor 72. In yet another embodiment of the control circuit 70, the microprocessor 72 includes a data unit 96, which stores ballistic parameters used by the ballistic computer 30.

Figure 4:
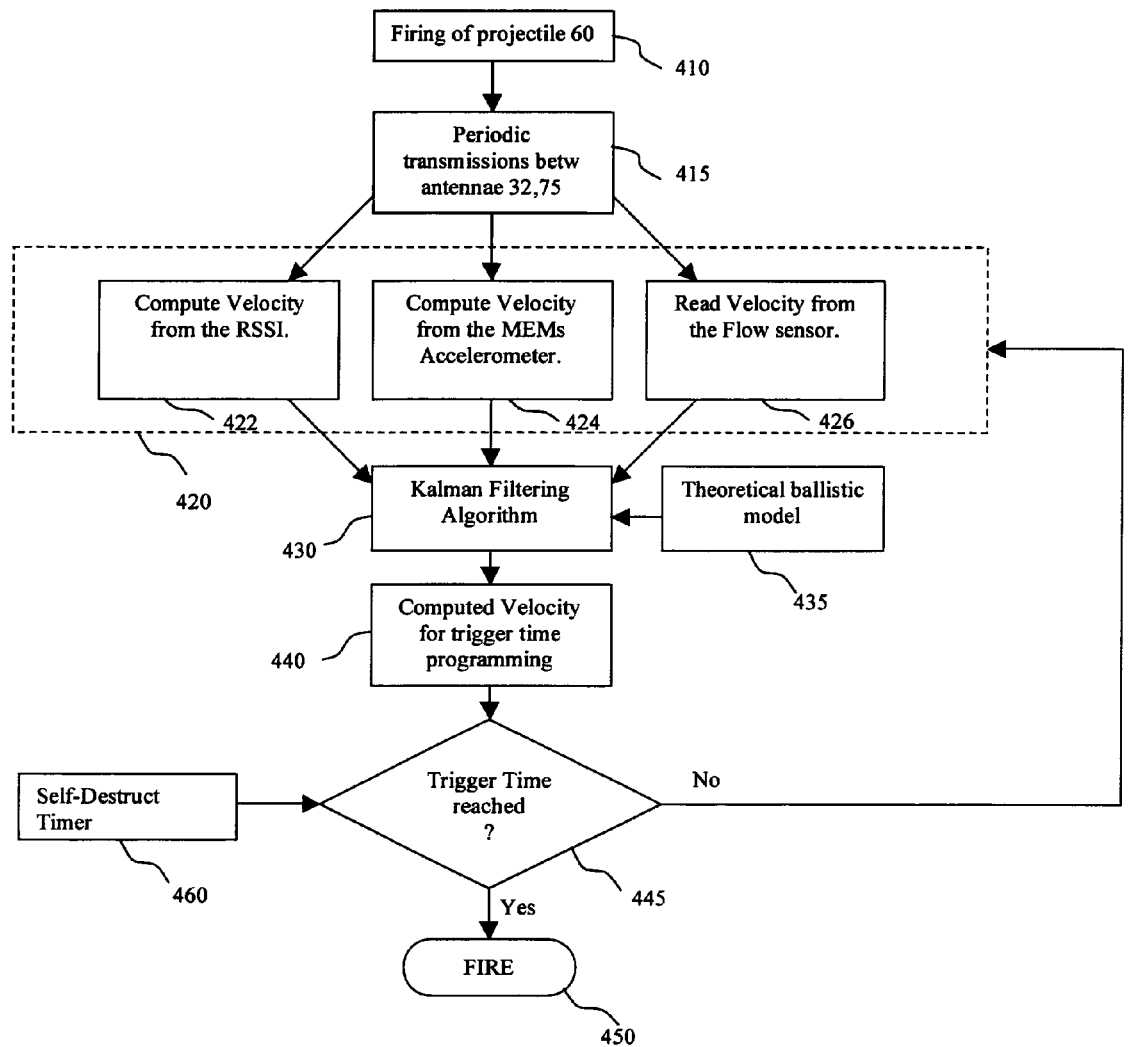
FIG. 4 illustrates an algorithm for updating a trigger time of the projectile according to another embodiment of the present invention.

FIG. 4 illustrates a process flow 400 during in-flight programming of the projectile 60. Process box 410 represents loading of an ammunition round 50 into a firing chamber of the barrel 20 and firing of the associated cartridge 52. After the cartridge 52 is fired, the projectile 60 is projected through the gun barrel 20 at high speed and acceleration. A predetermined time To after firing of the cartridge 52, the projectile 60 exits from the barrel 20. The speed of the projectile 60 at the exit of the barrel 20 with known direction of the barrel defines the muzzle velocity Vo of the projectile.

At the same instant To, the projectile's control circuit 70 gives out a signal So. At another predetermined time T1 after firing of the cartridge, the control circuit 70 gives out an additional signal S1. Similarly, at yet another predetermined time T2, another signal S2 is sent out. The sending out of signals at predetermined time after firing of the cartridge is represented in process box 415. In the next process, represented by box 420, the speed of the projectile 60 at the relevant predetermined time periods are determined.

As shown in FIG. 4, the process box 420 illustrates three independent processes. In the first process, represented by box 422, the signal S corresponding to the respective predetermined time periods are received by the antenna 32. The signal received by the antenna 32 is fed, via input 41, to the central processor 40 of the ballistic computer 30. The central processor 40 then determines the signal's strength at the respective time period. By looking up signal strength-distance data stored in the ballistic computer 30, the speed of the projectile 60 at each predetermined time is calculated. In one embodiment, the calculated actual speed of the projectile 60 at each predetermined time To,T1,T2, etc. is sent via the antenna 32 to the projectile 60 whilst it is airborne. In another embodiment, the actual speeds of the projectile 60 corresponding to each time period To,T1,T2, etc. are coded into a signal, which is sent to the projectile 60, via the RSSI input 72b. In another embodiment, the calculated speed of the projectile 60 at each predetermined time is converted in the ballistic computer 30 as firing time, which is then transmitted to the projectile 60 whilst the projectile is within range of the antenna transmission.

In the second process, represented by box 424, acceleration of the projectile 60 obtained from the micro-electromechanical (MEM) accelerometer 94 is integrated with time of flight, and the actual flight speed is then determined at the respective predetermined time To,T1,T2, etc.

In the third process, represented by box 426, the actual flight speeds of the projectile 60 at the respective predetermined time To,T1,T2, etc. are obtained from the flow sensor 92.

The actual flight speed of the projectile 60, as determined by each of the process represented by box 422,424,426, is then inputted into process box 430. In process box, 430, a Kalman filtering algorithm is employed to operate on the outputs of processes 422,424,426 at each predetermined time period To,T1,T2, etc. In addition, the theoretical ballistic parameters used by the ballistic computer 30 may be inputted, from box 435, into the Kalman filtering process 430. The recursive nature of the Kalman filter provides a better estimate of the actual speed of the projectile 60 at the respective time period. In another embodiment, reliability or weighting factors may be applied to the outputs of processes 422,424, 426 before the respective output is operated by the Kalman filtering algorithm 430.

The better estimate of the actual speed of the projectile 60 at a predetermined time, for example at To,T1,T2, etc. whilst the projectile is still airborne, is used, in process 440, to provide a better prediction of the remaining flight time. The predicted remaining flight time is then used to set the trigger time for the detonation circuit 80 to activate its FIRE output.

As shown in FIG. 4, when the projectile 60 is still airborne, a decision is then made in process box 445. In decision box 445, if the trigger time has not elapsed, the process reverts to box 420 and the actual speed of the projectile is determined again in processes 422,424,426. If transmission between the antennae 32 and 75 is no longer effective, the Kalman filtering process 430 may recursively estimate the actual speed of the projectile 60 based on the results of processes 424 and 426. Once the trigger time is reached, the microprocessor 72 or timer 76 activates the detonation circuit 80 and the explosive charge 52 is fired.

In the above embodiment of the present invention, the computations of the actual velocity of the projectile 60 at each predetermined time and Kalman filtering are carried out by the microprocessor 72. In another embodiment, such computation may be done at the ballistic computer 30 and results of computations may be coded in radio signal transmissions between antennae 32 and 75. In another embodiment, these radio signals may be encrypted by encoder/decoder 74 in the respective analog end 34,73 of the antennae 32,75, central processor 40 or microprocessor 72.

In another embodiment of the present invention, after a predetermined time after the cartridge 52 is fired and corresponding to a safety distance from the gun system 10, the microprocessor 72 sets the detonation circuit 80 to its arm mode.

While specific embodiments have been described and illustrated, it is understood that many changes, modifications, variations and combinations thereof could be made to the present invention without departing from the scope of the invention. For example, the gun system 10 may be a large caliber gun mounted on a launch vehicle and the central processor 40 in the ballistic computer 30 may include an addition channel 47 for connection with another antenna that is spaced apart from the antenna 32. With this additional antenna, the central processor 40 receives another signal strength input and/or velocity feedback; this additional signal strength input at a known distance from the ballistic computer 30 allows more accurate determinations of the projectile's muzzle speed and in-flight speed/location. Further, the projectile may incorporate a self-destruct detonation mechanism so that unexploded ammunition would self-destruct after they are armed and fired. In another example, the microprocessor 72 may also additionally determine the projectile's actual speed from the Doppler frequency shift input 42. In yet another embodiment, the present invention may be used for firing tear gas and similar irritants.

The invention claimed is:

1. A method of programming a trigger time of a projectile, the method comprising:
    determining a muzzle velocity of a projectile after said projectile exits from an associated gun barrel;
    determining an flight speed of the projectile a predetermined time after said projectile has been fired; and
    accounting for the deviation of the projectile's muzzle velocity and flight speed from those determined by an associated ballistic computer and programming the trigger time during the remaining flight time as the projectile is reaching its target, thereby optimizing the effectiveness of the projectile;
    wherein determining said projectile's muzzle velocity and flight speed comprises emitting a signal from said projectile at relevant predetermined time after said projectile is fired and determining strength of said signal received by an antenna connected to said ballistic computer, and calculating said projectile's speeds from signal strength-distance data stored in said ballistic computer.

2. A method according to claim 1, further comprising determining the projectile's muzzle velocity and flight speed by a flow sensor at relevant predetermined time after the projectile is fired.

3. A method according to claim 2 further comprising determining the projectile's muzzle velocity and flight speed by integrating the projectile's acceleration with time of flight by a MEMs accelerometer.

4. A method according to claim 2 or 3, wherein results of determining the projectile's muzzle velocity and flight speed are transmitted back to said ballistic computer.

5. A method according to claim 4, wherein the projectile's muzzle velocity and flight speed determined by independent processes are combined with reliability weighting factors.

6. A method according to claim 4, wherein the projectile's muzzle velocity and flight speed determined by independent processes are recursively obtained by employing a Kalman filtering algorithm.

* * * * *